United States Patent [19]

Cole et al.

[11] Patent Number: 4,636,839

[45] Date of Patent: Jan. 13, 1987

[54] METHOD OF AND APPARATUS FOR GENERATING COLOR MATTE SIGNALS

[75] Inventors: David J. Cole; Ian S. Cosh, both of Cambridge, England

[73] Assignee: U.S. Philips Corporation, New York, N.Y.

[21] Appl. No.: 725,466

[22] Filed: Apr. 22, 1985

[30] Foreign Application Priority Data

Apr. 26, 1984 [GB] United Kingdom ................ 8410705

[51] Int. Cl.$^4$ .............................................. H04N 9/74
[52] U.S. Cl. ...................................... 358/22; 358/81; 358/82
[58] Field of Search ............................. 358/22, 81, 82

[56] References Cited

U.S. PATENT DOCUMENTS 4,319,266 3/1982 Bannister .............................. 358/22

Primary Examiner—Michael A. Masinick

Attorney, Agent, or Firm—Thomas A. Briody; William J. Streeter; Marianne R. Rich

[57] ABSTRACT

A method of generating color matte signals includes the steps of: inputting hue, saturation, and luminance values; calculating R, G and B color component values from the hue, saturation and luminance values; calculating luminance (Y), and color difference component (Cr and Cb) values from the calculated R, G and B values; and outputting the calculated Y, Cr, and Cb values. The hue value is in two parts, the first of which defines one of six segments formed by dividing each side of the color triangle in half and the second of which define intermediate values within the segment. The R, G and B values are determined by calculating three color components from the saturation, luminance and the second part of the hue value, and assigning the three color components to registers for holding R, G and B values in dependence on the segment defined by the first of the hue value.

6 Claims, 7 Drawing Figures

METHOD OF AND APPARATUS FOR GENERATING COLOR MATTE SIGNALS

BACKGROUND OF THE INVENTION

The invention relates to a method of generating colour matte signals comprising the steps of: inputting hue, saturation, and luminance values; and calculating red (R), green (G), and blue (B) colour component values from the hue, saturation and luminance values. The invention further relates to a colour matte generator having variable luminance, saturation, and hue controls comprising means for calculating red (R), green (G), and blue (B) colour components from the luminance, saturation, and hue values.

Colour matte generators have conventionally been used in television studio equipment such as special effects generators for providing background or foreground colour within a television picture particularly where a squeeze or compression of the picture has been carried out, the colour matte being used to fill up the rest (the black part) of the picture. Existing colour matte generators suffer from the disadvantages of either generating illegal colours, i.e. where the red, green or blue components take illegal values either negative or greater than the maximum permissible value, or restrict the range of available colours to ensure that illegal values are not generated.

SUMMARY OF THE INVENTION

It is an object of the invention to enable the provision of a colour matte generator in which a wide range of colours can be generated without allowing the generation of illegal colours.

The invention provides a method of generating colour matte signals comprising the steps of:
inputting hue, saturation, and luminance values; and calculating red (R), green (G) and blue (B) colour component values from the hue, saturation and luminance values, characterised in that the method further comprises the steps of calculating luminance (Y), and colour difference component (Cr and Cb) values from the calculated R, G and B values;
and outputting the calculated Y, Cr, and Cb values: wherein the hue value is formed in two parts, the first of which defines one of six segments formed by dividing each side of the colour triangle in half and the second of which defines intermediate values within the segment and the step of calculating the R, G and B values comprises the further steps of:
calculating three colour components from the saturation, luminance and the second part of the hue value;
and assigning the three calculated colour components to registers for holding red (R), green (G) and blue (B) values in dependence on the segment defined by the first of the hue value.

A method of generating colour matte signals in which the saturation and luminance values are both defined as 8 bit words and the hue is defined as a 10 bit word, the three most significant bits of the hue value forming the first part may comprise the steps of:
(1) inputting hue, saturation, and luminance values;
(2) doubling the second part of the hue value;
(3) detecting whether the first part of the hue value is 110 or 111 and if so converting the first part of the hue value to 000 or 001 respectively;
(4) detecting whether the first part of the hue value is odd or even and if it is even inverting the second part of the hue value;
(5) inverting the saturation value;
(6) calculating the value of three colour components D, E and F according to the following equations $$D = 1, \quad E = (1 - SH), \quad \text{and} \quad F = \overline{S}$$

where
S is the saturation value
$\overline{S}$ is the inverted saturation value
and $\overline{H}$ is the doubled second part of the hue value inverted;
(7) multiplying the values of D, E and F by the luminance value;
(8) assigning the multiplied D, E and F values to registers for holding the R, G and B values in dependence on the segment defined by the first part of the hue value;
(9) calculating Y', Cr' and Cb' values according to the following equations $$Y' = 0.299R + 0.587G + 0.114B,$$

$$Cr' = R - Y,$$

and $$Cb' = B - Y;$$

(10) scaling the Y', Cr' and Cb' values to form Y, Cr and Cb values; and
(11) outputting the Y, Cr and Cb values.

The method may further comprise the steps of:
inputting a destination address for the colour matte signal; and outputting the destination address with the calculated Y, Cr and Cb values.

The invention further provides a colour matte generator having variable luminance, saturation and hue controls comprising means for calculating red (R), green (G) and blue (B) colour components from the luminance, saturation and hue values, characterised by means for storing the selected luminance, saturation and hue values in digital form, means for calculating luminance (Y) and colour difference (Cr and Cb) component values from the R, G and B colour components, and means for outputting the luminance and colour difference component values, wherein the hue control selects one of six segments formed by dividing each side of the colour triangle in half and specifies an intermediate value within the segement, the colour matte generator further comprising means for calculating three colour components from the hue, luminance and saturation values and means for assigning the calculated colour components to registers for holding the red (R), green (G) and blue (B) component values in dependence on the selected segment.

A colour matte generator according to the invention has the advantage that the generation of illegal colours can be easily avoided either by ensuring that the equations used to calculate the R, G and B values are such that for any possible input value of luminance, saturation, and hue it is impossible to produce an illegal calculated value of R, G, or B or by inspecting the R, G and B values and forcing them to a desired level value, e.g. zero, if an illegal value, such as a negative value, is detected.

Means may be provided for selecting a destination address for the luminance and colour difference component values and producing an output code specifying said destination. Means may be provided for outputting the luminance and colour difference component values only during the field blanking period.

BRIEF DESCRIPTION OF THE DRAWINGS

An embodiment of the invention will now be described, by way of example, with reference to the accompanying drawings, in which.

DESCRIPTION OF THE PREFERRED EMBODIMENT

Figure 1:
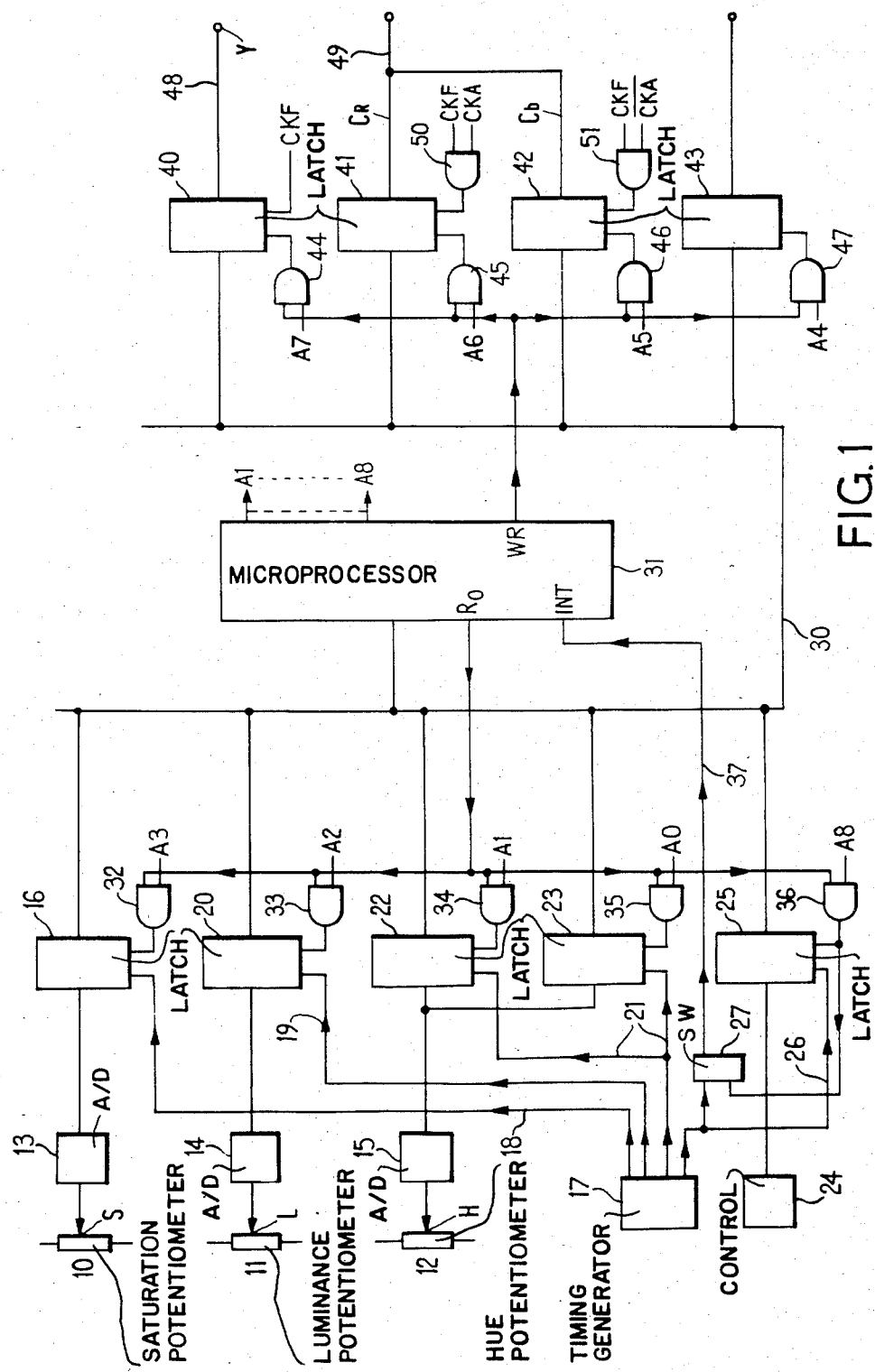
FIG. 1 shows in block schematic form a colour matte generator according to the invention.

FIG. 1 shows a colour matte generator which produces a luminance (Y) and colour difference (Cr, Cb) components plus a destination address for the luminance and colour difference components from inputs which comprise saturation, luminance, and hue controls plus a selection address to specify where the colour matte signals are to be used within a system. The luminance and colour difference components contain combinations of primary colour components of light, that is red (R), green (G), and blue (B). The colour difference components Cr and Cb are equivalent to (R−Y) and (B−Y) with appropriate scaling factors applied.

The matte generator may be functionally split into two parts: an RGB generator and a Y, Cr, Cb coder. Thus the first step is to translate the hue, saturation, and luminance values to R, G and B values and these are subsequently converted to Y, Cr and Cb.

The colour matte generator shown in FIG. 1 comprises three potentiometers 10, 11 and 12 by which values of saturation S, luminance L and hue H may be set. The analogue voltages selected by the potentiometers 10, 11 and 12 are converted into binary codes by means of analogue to digital converters (ADC) 13, 14 and 15. The ADCs 13 and 14 produce a 8 bit code for the saturations and luminance L while the ADC 15 produces a 10 bit code for the hue. As an alternative a single ADC with the potentiometer voltages multiplexed onto its input could be used. The saturation value is loaded into a latch 16 under the control of a timing signal generated in a timing generator 17 and fed to an enable input of the latch (register) 16 over a line 18. Similarly an enable signal is fed over a line 19 to a latch 20 to enable the luminance value to be loaded into the latch 20 and an enable signal is fed over a line 21 to latches 22 and 23 to enable the hue value to be loaded into the latches 22 and 23. Two 8 bit latches are required for the hue value as it is a 10 bit word. The selected destination for the colour matte is generated in a control circuit 24, which may simply be a switch or set of switches having a binary coded output, and is loaded into a latch 25 under the control of a signal on a line 26 which is generated in the timing generator 17. The signal on line 26 also sets a bistable circuit 27. The latches 16, 20, 22, 23 and 25 may be standard TTL 74LS374 eight bit latches while the bistale circuit 27 may be formed by two cross coupled NAND gates.

The outputs of the latches 16, 20, 22, 23 and 25 are connected to an eight bit data bus 30, to which data bus a microcomputer 31 is connected. The microcomputer may, for example, be that sold by Intel Corporation under the type number 8748. Since in this system information is always read from the latches 16, 20, 22, 23 and 25 and never written into these latches by the microcomputer 31 the output enable pins of the latches are enabled by the read output $R_o$ of the microcomputer combined with individual outputs A3, A2, A1, A0 and A8 from port 1 or port 2. These outputs $R_o$ and A are combined in respective AND gates 32, 33, 34, 35 and 36. The Q output of the bistable circuit 27 is fed to the interrupt input INT of the microcomputer 31 via a line 37 and the bistable circuit 27 is reset by the output enable signal applied to the latch 25.

Also connected to the data bus 30 are four output latches 40, 41, 42 and 43 in which the Y, Cr and Cb components and the destination address respectively are written. When the microcomputer 31 has calculated the Y, Cr and Cb components from the input saturation, luminance and hue values they are loaded into the respective latches together with the selected destination address. Since the microcomputer 31 never reads information from the latches 40 to 43 but always writes information into them their input enable pins are provided with a combination of the write signal from an output WR and individual outputs A7, A6, A5 and A4 from port 1 or port 2. These signals are combined in AND gates 44, 45, 46 and 47 respectively. The luminance component Y is available on an 8 bit bus 48 during the field blanking period under the control of a timing pulse CKF, this pulse being generated elsewhere in the system (not shown). The Cr and Cb colour difference components are multiplexed onto an 8 bit bus 49 during the field blanking period under the control of the timing pulse CKF combined with either CKA or $\overline{CKA}$ (inverted) in AND gates 50 and 51. The CKA signal is a 6.75 MHz clock signal and the Cr component is fed to an 8 bit bus 49 when CKA is high and the Cb component when CKA is low. The destination code is set to zero by the microcomputer 31 whenever the colour matte is changed and reset to the desired destination when the new colour matte value has been calculated.

In operation, at a time early in the field period the timing generator 17 causes the values of saturation, luminance, hue, and the destination set by the operator on the control panel to be read into the latches 16, 20, 22, 23 and 25. When the destination information is set into the latch 25 the bistable circuit 27 is also set causing an interrupt signal to be passed to the microcomputer 31 over the line 37. The microcomputer 31 then reads in turn the saturation, luminance, hue, and destination information from the latches 16, 20, 22, 23 and 25 and causes the bistable 27 to be reset thus removing the interrupt input. The microcomputer 31 then sets the latch 43 to zero and subsequently converts the saturation S, luminance L, and hue H values to luminance (Y), and colour difference (Cr, Cb) values and causes them to be read into the latches 40, 41 and 42 and subsequently writes the destination address into the latch 43. The Y, Cr and Cb values are then routed to the selected destination during the next field blanking period.

Figure 2:
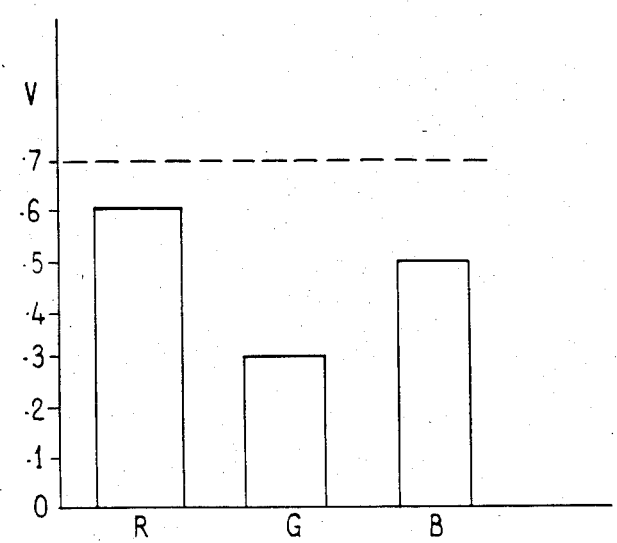
FIG. 2 shows red (R), green (G) and blue (B) components of a sample colour.

The matte generator may be functionally split into two parts: an RGB generator and a Y, Cr, Cb coder. Thus the first step is to translate the hue, saturation, and luminance values to R, G and B values. If the colour illustrated in FIG. 2 is considered i.e. 0.6VR+0.3VG+0.5VB it may be regarded as 0.3V of white+0.3V red+0.2V blue. This is a colour between red and blue which has been de-saturated by the addition of 0.3V white, i.e. it is a pale reddish magenta.

The amount of white is determined by the level of the smallest primary colour, in this case green. The saturation S is defined as $$\frac{\text{largest component} - \text{white component}}{\text{largest component}} \times 100\%.$$

which in this example is $(0.6-0.3)/0.6 \times 100\% = 50\%$ If a further 0.1V white is added, then 0.1V is added to each of the primary components so that the saturation now becomes $(0.7-0.4)/0.7 \times 100\% = 43\%$, i.e. the colour is less saturated. It should be noted that the hue has not changed since there is still 0.3V red+0.2V blue superimposed on 0.4V white. Since the white component is determined by the smallest of the primary components the saturation may be further defined as $$\frac{\text{largest component} - \text{smallest component}}{\text{largest component}} \times 100\%$$

The hue H is determined by the remainder when the white component has been removed.

$$\text{Hue} \alpha \frac{\text{middle component} - \text{smallest component}}{\text{largest component} - \text{smallest component}}.$$

The luminance component is defined by $$Y = 0.299R + 0.587G + 0.114B$$

i.e. it is related to the sum of all three primary colour components. Thus, if we halve all the colour components the luminance L will be halved but the hue H and saturation S (which are ratios) will be unchanged. Similarly the luminance can be increased by amplifying all the components by the same proportion until the largest component reaches its maximum value (e.g. 0.7V).

$$\text{So luminance} = \frac{\text{largest component}}{\text{maximum possible value}} \times 100\%.$$

Figure 3:
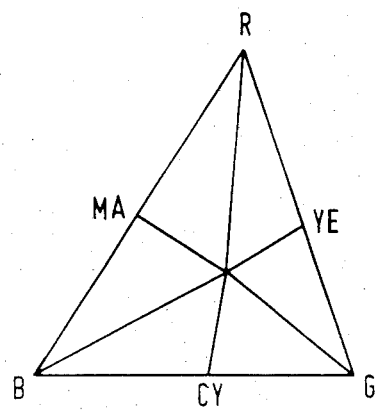
FIG. 3 shows schematically the known colour triangle.
Figure 4:
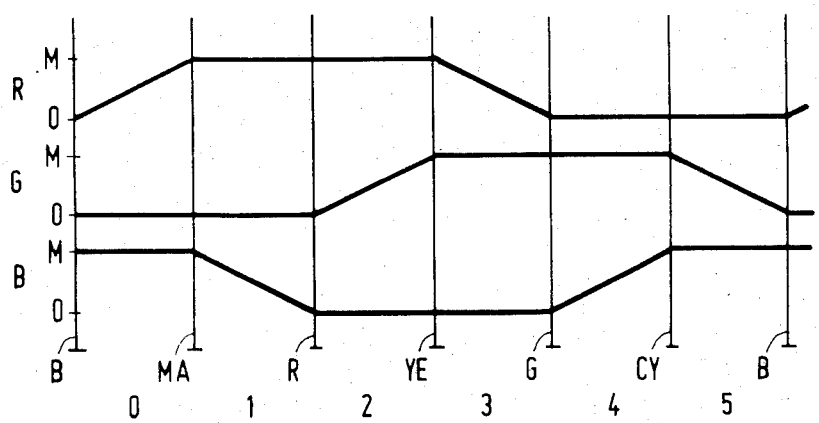
FIG. 4 shows R, G and B component values starting from the B apex of the triangle and travelling round its perimeter in a clockwise direction.

Consider a 100% luminance and 100% saturated colour. In this case the largest component is at the maximum value and the smallest component is zero (no white). Thus, considering FIGS. 3 and 4, with a 100% luminance 100% saturated colour we only have two primary colour components, one of which is at a maximum (M) and the other at an intermediate value. To generate all 100% luminance 100% saturated colours it is possible to travel round the edge of the colour triangle shown in FIG. 3 with the result shown in FIG. 4 for the magnitudes of the primary colour components R, G, and B. As shown in FIG. 4 the process can be divided into six segments 0 to 5 which extend between one apex and the mid point of each of the sides. At any point within a segment one colour is zero (10), one colour is at a maximum (M) and the third at an intermediate value. In FIGS. 3 and 4 colours are indicated as follows: B blue, MA magneta, R red, YE yellow, G green, and CY cyan.

Figure 5:
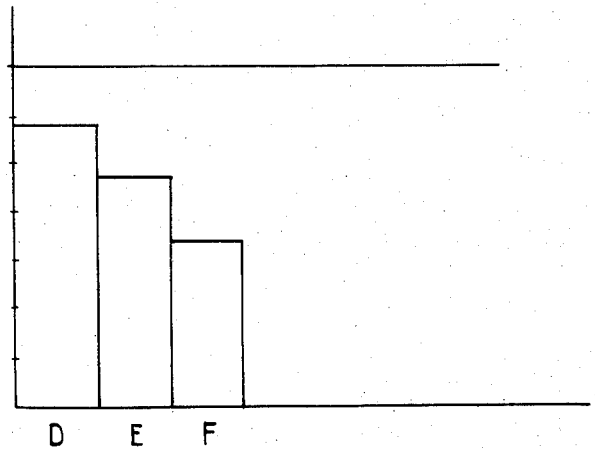
FIG. 5 shows unassigned calculated colour component values of a sample colour.

The color components R, G and B can be determined from the hue, saturation and luminance values (H,S,L) as follows. If the three components are D (largest), E (middle), F (smallest) (see FIG. 5) and D, E and F are not yet asigned to R, G, and B then, the hue can be defined as $$H = (E-F)/(D-F) \quad (1)$$

the saturation can be defined as $$S = (D-F)/D \quad (2)$$

and the luminance can be defined as $$(L=D)/\text{maximum possible value} \quad (3)$$

From (3)

$$D = L \times \text{maximum possible value} \quad (4)$$

From (2)

$$F = D(1-S) \quad (5)$$

From (1)

$$E = F + H(D-F) \quad (6)$$

From (6) and (2)

$$E = D(1-S) + H(D-D(1-S))$$

$$= D - DS + HD - HD + HDS$$

$$= D(1-S(1-H))$$

$$= D(1-SH) \quad (7)$$

If is is assumed that L=1 (100% luminance) initially, then $$D = 1$$

$$F = 1 - S = S$$

(i.e. S inverted)

$$E = 1 - SH$$

(i.e. H inverted)

Having calculated D, E and F on this assumption the actual luminance value can now be applied to the result by multiplying D, E and F by L/255 to produce D', E' and F' (1/255 following from the 8 bit word).

In order to produce the R, G and B components the values of D', E' and F' are assigned to the R, G and B registers in accordance with the segment code as set out in Table 1, in view of FIG. 4.

TABLE 1

| Segment No. | D' | E' | F' |
|---|---|---|---|
| 0 | B | R | G |
| 1 | R | B | G |
| 2 | R | G | B |
| 3 | G | R | B |

TABLE 1-continued

| Segment No. | D' | E' | F' |
|---|---|---|---|
| 4 | G | B | R |
| 5 | B | G | R |

The R, G and B components have a maximum value of 255 which corresponds to 0.7V into an RGB monitor and a minimum value of 0 corresponding to 0V.

To convert from the RGB components to Y, Cr, and Cb a value for Y' is determined, the prime (') is used to distinguish this value from the final scaled output value.

$$Y'=0.229R+0.587G+0.114B$$

Since 1.0≡255 this becomes $$Y'=1/255[(76\times R)+(150\times G)+(29\times B)]$$

Scale Y' to EBU standard Y where 16≡0 and 235≡1.0 so $$Y=Y'[(235-16)/255]+16\approx Y'\times 220/256+16.$$

A value for Cb' is found using $Cb'=B-Y'$

To scale Cb' to Cb use the fact that Cb is a maximum when B=255, R=0 and G=0.

So $$Y'=29\ Cb'=B-Y'=255-29=226.$$

To accord with the EBU standard the maximum value of Cb should be 112 so $Cb=Cb'\times 127/256+128$.
In a similar manner it can be shown that $$Cr=Cr'\times 160/256+128.$$

Figures 6, 7:
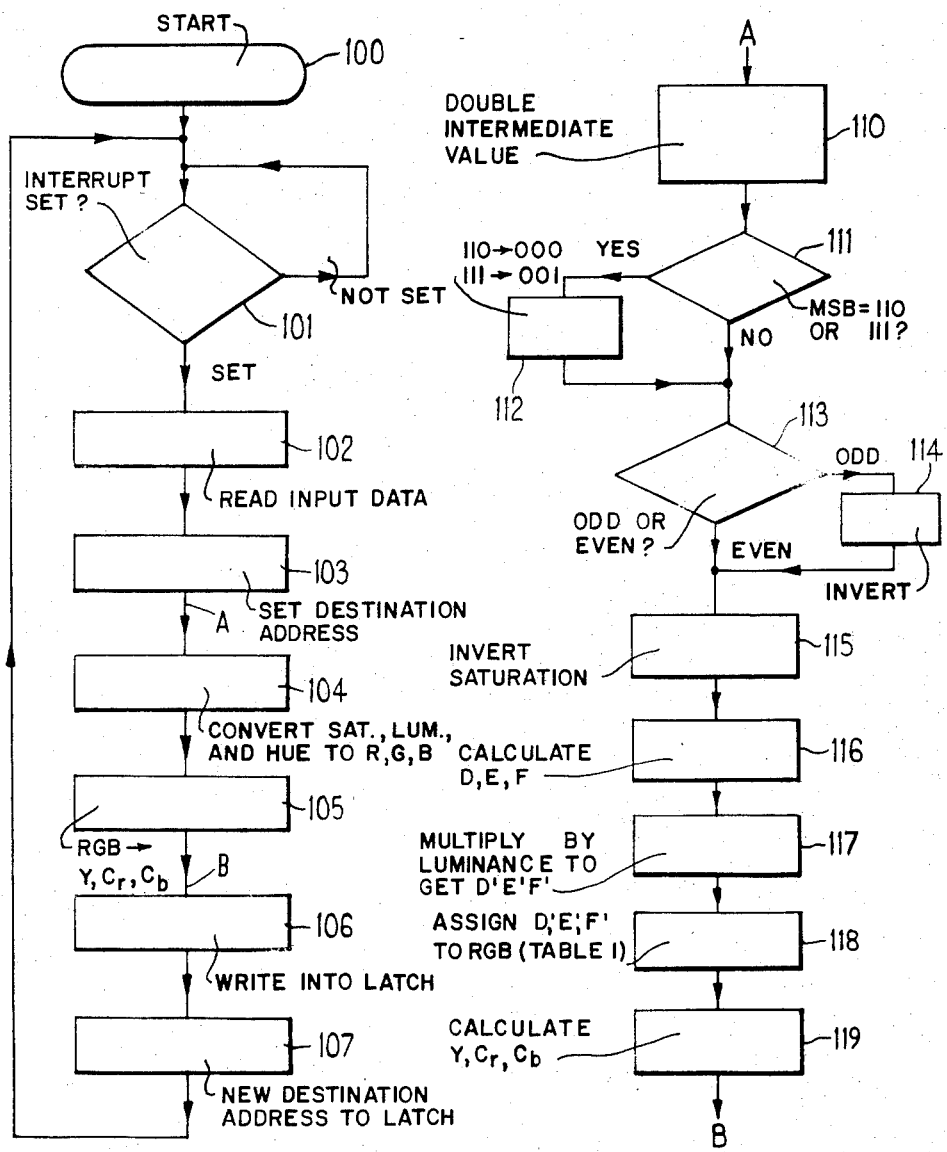
FIG. 6 shows a flow diagram illustrating a method of generating a colour matte signal according to the invention.
FIG. 7 is a flow diagram illustrating in greater detail the steps between points A and B of the flow diagram shown in FIG. 6.

FIGS. 6 and 7 show flow diagrams of the operation of the colour matte generator as controlled by the microcomputer 31 of FIG. 1. In FIG. 6 the box 100 represents the start of the process. Box 101 represents a monitoring of the interrupt input. If the interrupt is set then the microprocessor 31 reads the input data (Box 102) i.e. the saturation, luminance, hue, and destination address stored in the latches 16, 20, 22, 23 and 25. If the interrupt is not set then the interrupt input is continuously monitored until it is set. The next step is to set the destination address in the latch 43 is zero (box 103) and then the saturation, luminance and hue values are converted into RGB values (Box 104). The RGB values are then converted to Y, Cr, Cb values (Box 105) and written into the latches 40, 41 and 42 (Box 106). Finally the new destination address is written into the latch 43 (Box 107) and subsequently the microcomputer 31 returns to monitoring its interrupt input. The process takes approximately a quarter of the field period and hence the new matte value is available well before the start of the next field period.

FIG. 7 shows in greater detail the processes represented in boxes 104 and 105 of FIG. 6. Since the hue is in the form of a 10 bit number the most significant 3 bits of which represent the segment code and the least significant 7 bits represent the intermediate states in each segment the first step (Box 110) is to double the intermediate value to bring it to an 8 bit code. The three most significant bits of the original hue setting are monitored (Box 111) and if the segment code is 6 or 7, i.e. 110 or 111, this is converted to 0 or 1 respectively (Box 112). This allows overlap at both ends of the hue setting potentiometer 12 of FIG. 1. The segment code is then further examined (Box 113) to determine whether it is an odd or even segment i.e. the presence or absence of a '1' in the least significant bit position. If it is an odd segment the hue value (7 least significant bits doubled) is inverted (Box 114). The hue values are inverted in odd segments since an increasing value causes a decreasing primary colour content in odd segments. FIG. 4 illustrates this since in segments 1, 3 and 5 the B, R, and G components respectively steadily decrease whereas in segments 0, 2 and 4 the R, G, and B components respectively steadily increase. The saturation value is then inverted (Box 115). Three colour components D, E and F are then calculated where D>E>F. These components are not yet assigned to R, G and B. The first step is to calculate values for D, E, and F (Box 116) on the assumption that luminance is 100% in which case D=100%=1, $F=(1-S)=S$, $E=1-SH$ where S is saturation and H is hue and $\bar{S}$ and $\bar{H}$ are saturation and hue inverted. Luminance is then taken into account (Box 117) by multiplying D, E and F by the luminance value to form D', E' and F'. The next step is to assign D', E' and F' to R, G, and B (Box 118) in accordance with the segment code according to table 1.

The values of Y, Cr, and Cb are then calculated (Box 119) using the equations $$Y=0.299R+0.587G+0.114B$$

$$Cb=B-Y$$

$$Cr=R-Y$$

While the method and apparatus described use a 10 bit code for the hue value and 8 bit codes for the luminance and saturation value these codes are only illustrative. If the second part of the hue code has the same bit length as the luminance and saturation codes then the second part of the hue value would not be doubled.

We claim:
1. A method of generating colour matte signals comprising the steps of:
 inputting hue, saturation, and luminance values; and calculating R, G and B colour component values from the hue, saturation and luminance values;
 characterised in that the method further comprises the steps of calculating luminance (Y), and colour difference (Cr and Cb) component values from the calculated R, G and B values; and outputting the calculated Y, Cr, and Cb values; wherein the hue value is formed in two parts, the first of which defines one of six segments formed by dividing each side of the colour triangle in half and the second of which define intermediate values within the segment and the step of calculating the R, G and B values comprises the further steps of:
 calculating three colour components from the saturation, luminance and the second part of the hue value;
 and assigning the three colour components to registers for holding R, G and B values in dependence on the segment defined by the first part of the hue value.

2. A method according to claim 1, characterised in that the saturation and luminance values are both defined as 8 bit words and the hue is defined as a 10 bit word, the three most significant bits of the hue value forming the first part comprising the steps of:

(1) inputting hue, saturation, and luminance values;
(2) doubling the second part of the hue value;
(3) detecting whether the first part of the hue value is 110 or 111 and if so converting the first part of the hue value to 000 or 001 respectively;
(4) detecting whether the first part of the hue value is odd or even and if it is even inverting the second part of the hue value;
(5) inverting the saturation value;
(6) calculating the value of three colour components D, E and F according to the following equations $$D = 1, E = (1 - S\bar{H}),$$

and $$F = \bar{S}$$

where S is the saturation value
$\bar{S}$ is the inverted saturation value
and $\bar{H}$ is the doubled second part of the hue value inverted;

(7) multiplying the values of D, E and F by the luminance value;
(8) assigning the multiplied D, E and F values to registers for holding the R, G and B values in dependence on the segment defined by the first part of the hue value;
(9) calculating Y', Cr' and Cb' values according to the following equations $$Y' = 0.299R + 0.587G + 0.114B,$$

$$Cr' = R - Y,$$

and $$Cb' = B - Y;$$

(10) scaling the Y', Cr' and Cb' values to form Y, Cr and Cb values; and
(11) outputting the Y, Cr and Cb values.

3. A method according to claims 1, characterised by the further steps of:
inputting a destination address for the colour matte signal;
and outputting the destination address with the calculated Y, Cr and Cb values.

4. A colour matte generator having variable luminance, saturation and hue controls, the colour matte generator comprising means for calculating R, G and B colour components from the luminance, saturation and hue values, characterised by means for storing the selected luminance saturation and hue values in digital form, means for calculating luminance (Y) and colour difference (Cr, Cb) component values from the R, G and B colour components and means for outputting the luminance and colour difference component values, wherein the hue control selects one of six segments formed by dividing each side of the colour triangle in half and specifies an intermediate value within the segment, the colour matte generator further comprising means for calculating three colour components from the hue, luminance and saturation values and means for assigning the calculated colour components to registers for holding the red (R), green (G) and blue (B) component values in dependence on the selected segment.

5. A colour matte generator as claimed in claim 4 characterised by means for selecting a destination address for the luminance and colour difference component values and producing an output code specifying said destination.

6. A colour matte generator as claimed in claim 4 characterised by means for outputting the luminance and colour difference component values during the field blanking period.

* * * * *